J. W. SOUTHERN.
GASKET FOR HOSE COUPLINGS.
APPLICATION FILED FEB. 27, 1918.
1,295,228.
Patented Feb. 25, 1919.
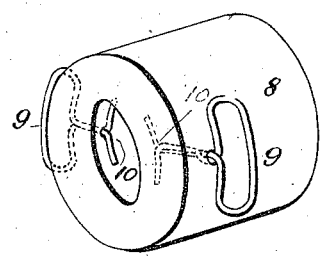
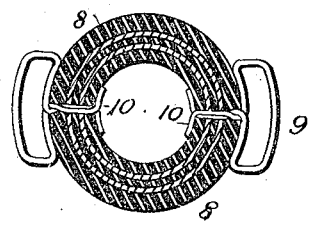
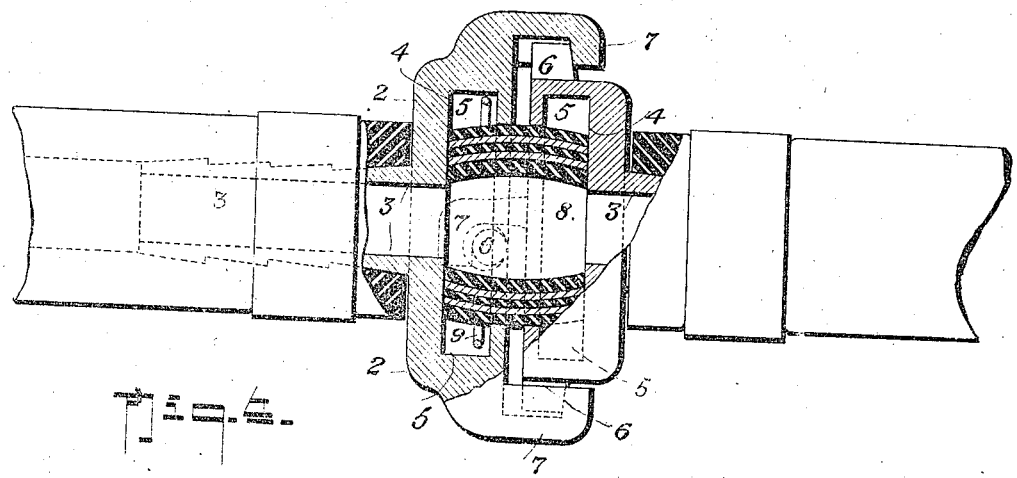
INVENTOR
John Wm. Southern
BY
Fred J. Dieterich
ATTORNEYS

UNITED STATES PATENT OFFICE.

JOHN WM. SOUTHERN, OF VANCOUVER, BRITISH COLUMBIA, CANADA.

GASKET FOR HOSE-COUPLING.

1,295,228.

Specification of Letters Patent.

Patented Feb. 25, 1919.

Application filed February 27, 1918. Serial No. 219,443.

*To all whom it may concern:*

Be it known that I, JOHN W. SOUTHERN, a citizen of the Dominion of Canada, residing at Vancouver, in the Province of British Columbia, Canada, have invented certain new and useful Improvements in Gaskets for Hose-Couplings, of which the following is a specification.

This invention relates to a gasket for rendering air-tight the joint of a pipe coupling such as is used to connect the air delivery pipes of pneumatic tools. These joints at present are made by flanged gaskets molded of solid rubber, one in each half of the coupling and jointing together when the coupling connection is made.

There are thus two gaskets for each coupling and therefore three joints to maintain air-tight. Further, the separate joint is a rubber-to-rubber one which, when made and broken frequently, is liable to be much impaired in a short time as the rubber faces will to some extent adhere and when drawn apart tear away small pieces from either face.

In the invention, which is the subject of this application, a single tubular gasket is used which is connected to one coupling and forms a separable connection with the face of the other coupling, so that only two air-tight joints are present in the connection of the gasket with the coupling.

Further, the material used need not be of specially molded solid rubber but it may be made of a short section of canvas and rubber-lined air pipe. This short tubular gasket is provided on diametrically opposite sides with simple wire formed projections adjacent one end, which projections enter into the circumferential groove at present used to receive the flanged gasket. The tubular gasket is thus connected to one of the coupling members ready for application of the other coupling member to it.

The invention is fully described in the following specification, reference being made to the drawings by which it is accompanied, in which:

Figure 1 is a perspective view of the tubular gasket.

Fig. 2 is a cross section thereof.

Fig. 3 is a detail perspective view, on a somewhat enlarged scale, of one of the retaining loops hereinafter specifically referred to.

Fig. 4 is a longitudinal section, parts being in side elevation, of a coupling showing the embodiment of my invention therewith.

In these drawings 2 represents each part of an air pipe coupling to which the gasket 8, which is the particular subject of this application, may be applied. One of these parts 2 is secured to an end of each air hose-pipe which it is required to connect. Each has a spigot portion 3 for insertion into the hose-pipe and a joint face 4 which is surrounded with an annular groove 5.

Outside the groove 5 each part 2 of the coupling is provided with radially projecting studs 6 and quartered therewith each is provided with projections 7 designed to engage and retain the studs 6 of the other half of the coupling and hold the coupling against endwise movement apart.

The gasket 8, which is the particular subject of this application, is plainly cylindrical and is preferably cut from a canvas reinforced rubber tube. Its length should be slightly in excess of the distance between the faces 4 of the coupling when the two parts are connected together that it may be under endwise compression in use.

In order to secure the tubular gasket 8 to one half of the coupling, that it may be retained therewith when the joint is broken, wire loops 9 are secured to diametrically opposite sides of the gasket at such distance from one end that they will lie in the groove 5 of that half of the coupling to which it is considered desirable to connect the gasket.

These loops 9 are preferably secured to the gasket by passing the two ends 10 of each loop together through the wall of the gasket 8 and by clenching these ends within the gasket by bending them apart, each to the side of the loop to which they belong, as shown in Fig. 3. The inner side of the loop is bent to conform to the circle of the gasket, so that the clenching bend 10 holds the loop firmly parallel to the end of the gasket, and the outer side of the loop is also concentric with the gasket so that it will conveniently lie in the groove 5 of the coupling.

The retaining loops 9 are preferably at such distance from the end of the gasket 8 that the gasket is not held against the face 4 of the coupling by engagement of the wire of the loop with the inner side of the groove 5.

With a gasket so constructed and applied, when the coupling is connected, the ends of the gasket are tightly pressed into contact with the faces 4 of the coupling and this compression and the internal pressure of the air bulges it slightly outward, as shown in Fig. 4.

The gasket makes a most effective joint as there are only two faces to keep tight, those on the joint faces 4 of the coupling, as compared with three in the ordinary flanged gasket as at present used. Further, the separable joint is the end of the gasket on faced metal of one of the coupling members, instead of the rubber-to-rubber joint, as in the flanged gasket referred to.

The gasket is also cheaper to manufacture and easier to apply, one of the wire loops 9 being passed into the groove 5 on one side, and the other loop may then be readily passed under the opposite side by pressing the sides of the gasket together.

It is also less liable to blow out when the coupling is disconnected, as occasionally happens with the flanged gasket, where the escaping air gets under the wide flange.

Having now particularly described my invention, I hereby declare that what I claim as new and desire to be protected in by Letters Patent, is.

1. A gasket for an air pipe coupling, comprising a hollow open-ended cylinder of impermeable elastic material, said cylinder having flat ear-like projections from its outer surface, which projections are adjacent and parallel to one end of the cylinder and on diametrically opposite sides thereof.

2. A gasket for an air pipe coupling, comprising a short length of rubber tube having flat ear-like projections from diametrically opposite sides of the cylinder, which projections are adjacent and parallel one end of the tube.

3. A gasket for an air pipe coupling, comprising a short length of rubber tube having loops of wire projecting from diametrically opposite sides of the outer surface of the cylinder, said loops being adjacent and parallel to one end.

4. A gasket for an air pipe coupling, comprising the combination with coupling members having opposed face joints and an annular groove surrounding each, of a hollow cylinder of rubber or the like adapted to endwise fit tightly between the joint faces, and ear-like members projecting from the outer surface of the cylinder for engaging the annular groove of the face joint of one half of the coupling to retain the cylinder in its connection therewith.

5. A gasket for an air pipe coupling, comprising the combination with coupling members having opposed face joints and an annular groove surrounding each face, of a hollow cylinder of rubber or the like adapted to tightly fit endwise between the joint faces of the coupling when the same is connected and a loop of wire secured to diametrically opposite sides of the cylinder to project therefrom parallel to and adjacent one end face, the ends of the wire of said loops being passed together through the material of the cylinder and clenched on the inner side by bending each end toward the side of the loop to which it belongs.

In testimony whereof I affix my signature.

JOHN WM. SOUTHERN.